(12) United States Patent
Jaunasse

(10) Patent No.: US 6,805,532 B2
(45) Date of Patent: Oct. 19, 2004

(54) TORQUE CONVERTER REACTOR

(75) Inventor: Philippe Jaunasse, Paris (FR)

(73) Assignee: Dype Plastique, Le Plessis-Trevise (FR)

( * ) Notice: Subject to any disclaimer, the term of this patent is extended or adjusted under 35 U.S.C. 154(b) by 0 days.

(21) Appl. No.: 10/266,926

(22) Filed: Oct. 9, 2002

(65) Prior Publication Data
US 2003/0077168 A1 Apr. 24, 2003

(30) Foreign Application Priority Data
Oct. 11, 2001 (FR) .............................................. 01 13120

(51) Int. Cl.[7] .............................................. F16D 33/00
(52) U.S. Cl. .................... 415/208.2; 415/104; 415/111; 416/180; 416/197 C
(58) Field of Search .............................. 415/208.2, 111, 415/104, 200; 416/180, 197 C; 60/339, 345; 192/41 R, 110 B, 113.1

(56) References Cited

U.S. PATENT DOCUMENTS

| | | | |
|---|---|---|---|
| 5,094,076 A | * | 3/1992 | Henricks ...................... 60/345 |
| 5,655,875 A | | 8/1997 | Sekine |
| 5,760,514 A | * | 6/1998 | Taniguchi et al. ............. 310/92 |
| 5,779,014 A | * | 7/1998 | Kinoshita et al. .......... 192/41 R |
| 6,059,088 A | | 5/2000 | Sekine et al. |
| 6,123,505 A | * | 9/2000 | Sasse et al. .................. 415/200 |
| 6,481,549 B2 | * | 11/2002 | Kroll et al. ................ 192/41 R |

* cited by examiner

*Primary Examiner*—Ninh H. Nguyen
(74) *Attorney, Agent, or Firm*—Dennison, Schultz, Dougherty & MacDonald

(57) ABSTRACT

The reactor for a torque converter of the invention comprises a moulded body (32) able to be mounted around a reactor shaft (36) via freewheel (34), being arranged coaxially between an impeller (12) and a turbine (24) along one and the same axis (X—X). The body (32) of the reactor is moulded in thermoplastic and is overmoulded around an outer ring (50) that the freewheel (34) comprises. Advantageously, the body (32) also comprises an axial thrust bearing (60) on the same side as the impeller and an axial thrust bearing (62) on the same side as the turbine, which thrust bearings are moulded with the body. The invention applies to torque converters intended for the automatic transmissions of motor vehicles.

14 Claims, 9 Drawing Sheets

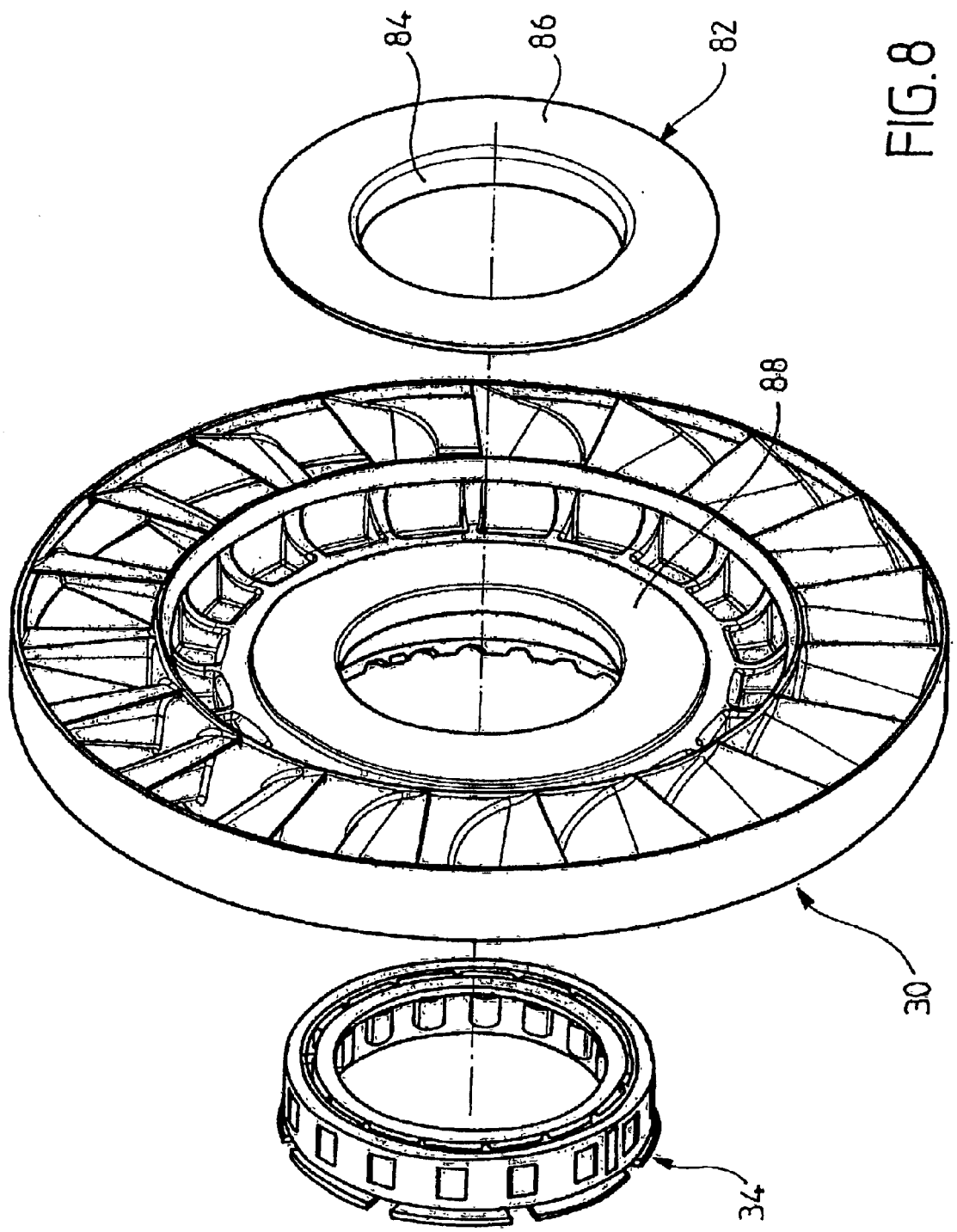

TORQUE CONVERTER REACTOR

The invention relates to the field of torque converters and relates more particularly to a reactor intended for such torque converter and to a method for manufacturing it.

Torque converters which comprise a reactor, also known as a "guide wheel", produced in the form of a moulded body which can be mounted around a reactor shaft via a freewheel are already known. This reactor is arranged coaxially between an impeller, also known as a pump wheel, and a turbine, also known as a turbine wheel, along one and the same axis.

These torque converters are used essentially in automatic transmissions of motor vehicles. The impeller is driven by the engine, while the turbine is connected to the vehicle transmission. The impeller and the turbine are produced in the form of cups facing each other and fitted with internal vanes, and between which an oil circulates under pressure, which oil may for example be a mineral oil or an oil of the DEXRON (trademark) type. The guide wheel also has vanes whose function is to straighten the fluids from the turbine and sent to the impeller. By virtue of its freewheel mechanism, the reactor may either be stationary or driven in rotation, but in just one direction.

There are currently two main techniques for manufacturing torque converter reactors.

Known first of all are aluminium reactors made by an injection-moulding technique which has the disadvantage of entailing subsequent machining work. Furthermore, these reactors are made in steel moulds which rapidly corrode and which therefore have to be replaced frequently.

Also known are reactors made of thermoset produced by an injection-compression moulding technique which entails baking each component in a mould, thus lengthening the cycle time. Furthermore, these thermosets do not allow the overmoulding of large-sized rigid inserts because they have a tendency to crack when they shrink around this type of insert.

The invention provides another solution to the problem of producing torque converter reactors.

For that purpose it proposes a reactor for a torque converter in which the body of the reactor is made of thermoplastic and is overmoulded around an outer ring that the freewheel comprises so that the thermoplastic covers an outer annulus of the outer ring and at least one annular face of the outer ring on the same side as the turbine.

Thermoplastics, unlike thermosets, have the advantage of having a long elongation at rupture, which allows them, in spite of the shrinkage, to accept the overmoulding of large-sized inserts without cracking.

In addition, overmoulding the outer ring of the freewheel makes it possible to maintain its as-produced outside diameter, thus reducing its cost. Furthermore, the earlier technologies, in which the ring is mounted in the reactor rather than overmoulded, dictate a need to have a precise bore in the reactor for the insertion of the ring and a precise outside diameter on the ring and, finally, in most cases, a thrust bearing on the turbine side (or on the impeller side) that can be removed so as to engage the ring in the reactor. All these specific requirements explain the higher cost of production of the assembly of the prior art.

Furthermore, a reactor for a torque converter comprises vanes each having a leading edge facing towards the turbine and a trailing edge facing towards the impeller. The invention anticipates that the trailing edge of each of the vanes is truncated at the time of moulding. This design allows the vanes to be mounted closer together and also makes it possible to reduce the risk of weakening of the trailing edges.

Other additional or alternative features of the reactor of the invention are as follows:

the body comprises an axial thrust bearing on the same side as the impeller and an axial thrust bearing on the same side as the turbine, at least one of these axial thrust bearings being moulded with the body;

the axial thrust bearing on the same side as the impeller and the axial thrust bearing on the same side as the turbine are moulded with the body, and the axial thrust bearing on the same side as the turbine is radially offset from the axis to allow direct mounting of the freewheel;

the axial thrust bearing on the same side as the impeller and the axial thrust bearing on the same side as the turbine each comprise radial lubricating and/or cooling ducts running in a generally radial direction;

the body comprises a bearing for rotational guidance about the reactor shaft, this bearing being equipped with axial lubricating and/or cooling ducts running in a generally axial direction and corresponding angularly with the radial lubricating and/or cooling ducts of the axial thrust bearing on the same side as the impeller;

the axial thrust bearing on the same side as the impeller is a needle thrust bearing, while the axial thrust bearing on the same side as the turbine is moulded with the body;

the needle thrust bearing comprises an inner cheek mechanically anchored in the plastic of the body by anchoring means and an outer cheek pressed against the impeller;

the inner cheek bears against an annular part of the body, which annular part bears against the outer ring;

the inner cheek bears against an annular part of the outer ring which extends as far as the reactor shaft;

the body is equipped with a flanged thrust bearing, made up of a cylindrical bush extended by a flange, forming a thrust bearing via its flange and a bearing via its bush, this flanged thrust bearing advantageously being made of a self-lubricating material so as to allow sliding on the impeller hub and the reactor shaft;

the body comprises retaining clips formed by moulded-in bosses projecting radially towards the axis to come into abutment against flexible elements of an outer cage of the freewheel, which is accommodated in the outer ring;

the outer ring is metallic, advantageously made of steel, and has reliefs of chosen shape, particularly knurling or corrugations, produced on the outer annulus of the outer ring and over which the plastic of the body is moulded.

In another aspect, the invention relates to a torque converter comprising a reactor arranged coaxially between an impeller and a turbine, the reactor being as defined hereinabove.

In the description that follows, given solely by way of example, reference is made to the appended drawings, in which:

FIG. 8 is an exploded perspective view of the reactor in FIGS. 6 and 7;

Figure 1:
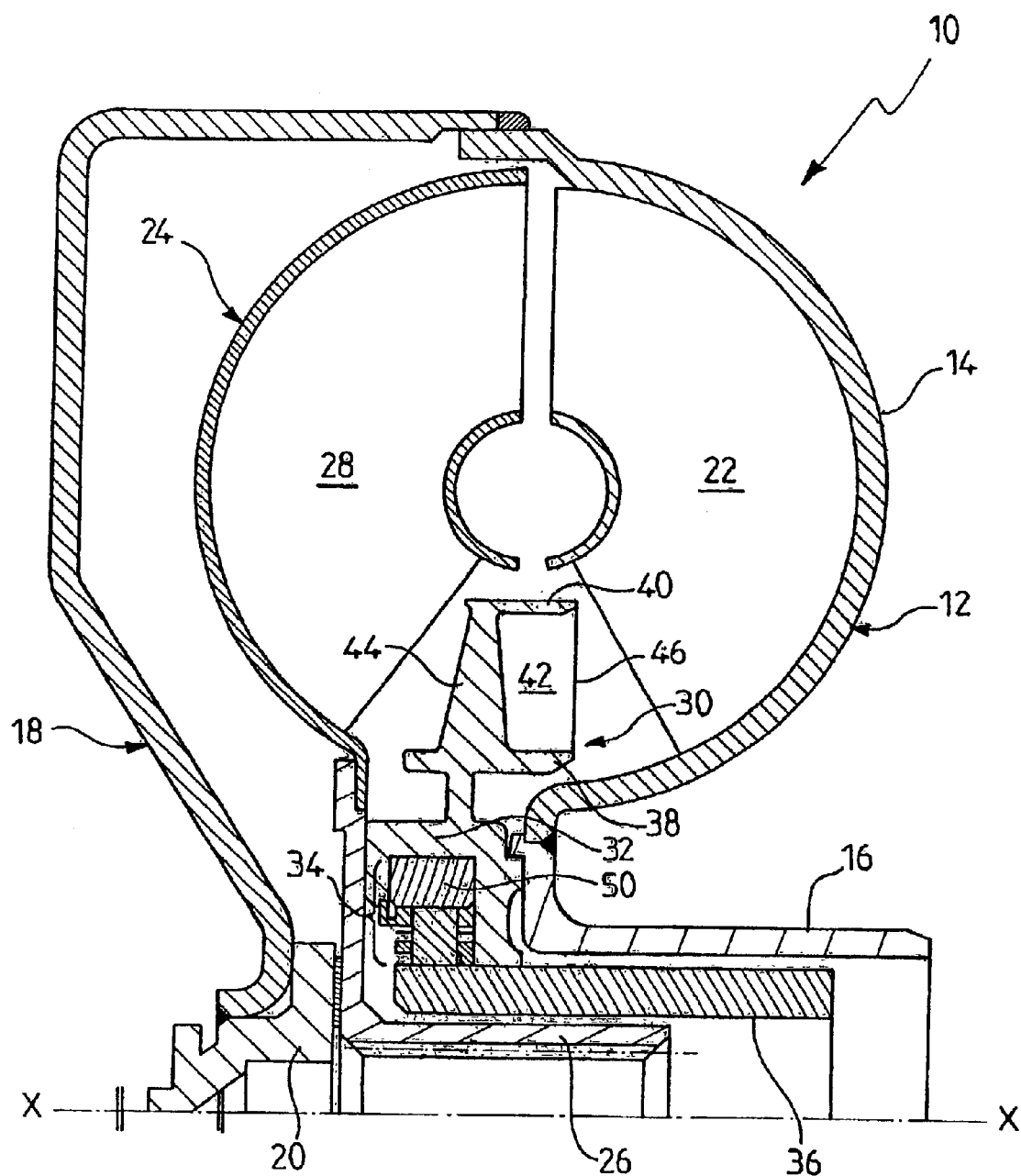
FIG. 1 is a half view in section on a plane passing through the axis of a torque converter comprising a reactor according to the invention.

The torque converter 10 depicted in FIG. 1 is of known overall structure. It comprises an impeller 12 (also known as a pump wheel) formed of a casing 14 in the shape of an annular cup connected to a bush 16 of axis X—X, also known as the impeller hub. At its periphery, the casing 14 is connected to the casing 18 of the torque converter equipped with a centring bush 20 on the flywheel. The flywheel (not depicted) drives the torque converter via the casing 18 by means of drive screws, also not depicted.

Arranged inside the impeller casing 14 are a certain number of vanes 22. Mounted inside the volume thus delimited by the impeller 12 and the casing 18 is a turbine 24 (also known as a turbine wheel) produced in the form of an annular cup with its concave side facing towards that of the impeller.

The turbine is connected to a bush 26 of axis X—X, known as the turbine hub. The turbine hub is, for example, splined and constitutes the power output of the torque converter. Formed inside the turbine 24 are vanes 28, running in a roughly radial direction and facing the vanes 22 of the impeller 12.

Mounted coaxially between the impeller 12 and the turbine 24 is a reactor 30 (also known as a guide wheel). This reactor 30 comprises a body 32 made of a moulded material and mounted, via a freewheel 34, around a fixed shaft 36 produced in the form of a hollow cylinder and arranged between the impeller 16 and turbine 26 hubs.

The moulded body 32 comprises an inner annulus 38 and an outer annulus 40 between which run vanes 42 each of which has a leading edge 44 facing towards the same side as the turbine 28 and a trailing edge 46 facing towards the same side as the impeller 12.

According to the invention, the body 32 of the reactor is produced by moulding a thermoplastic, being overmoulded around an outer ring 50 that the freewheel 34 comprises. For that, a thermoplastic is chosen which has the highest possible elongation at rupture and the lowest possible shrinkage, so as to limit the stresses in this material as it cools.

By way of non-limiting examples, use may advantageously be made of aromatic polyamides such as polyphthalamides (PPA), polyarylamides (PAA) or alternatively polyamides (PA). In this respect, particular preference is given to polyamides-4,6 (PA-4,6). Of course, use may alternatively be made of other types of material, such as liquid crystal polymers (LCP) for example. These materials are customarily combined with a filler, such as glass fibres, to give them mechanical strength, and inorganic substances to give them dimensional stability in spite of the thermal stresses.

Figure 2:
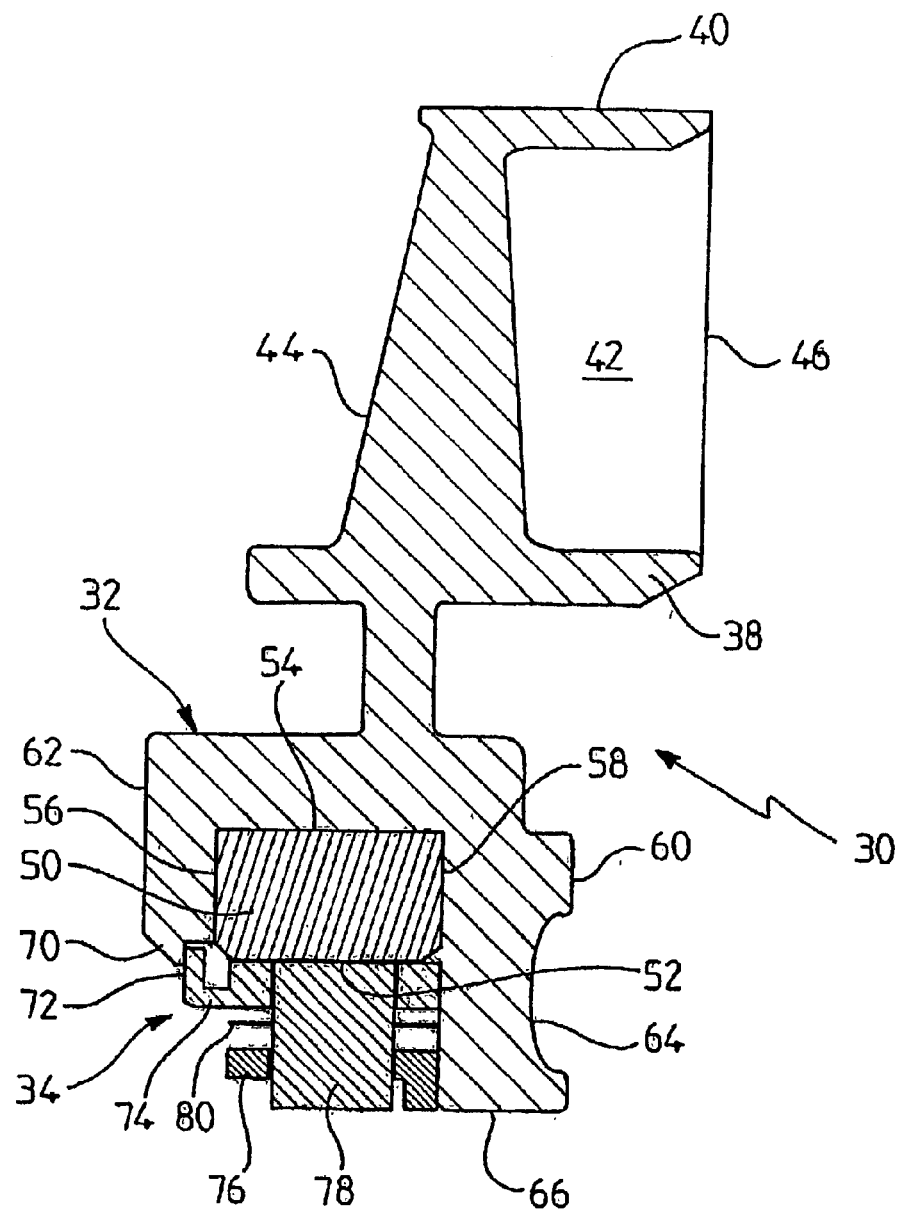
FIG. 2 is a half view in section of the reactor in FIG. 1.
Figure 10:
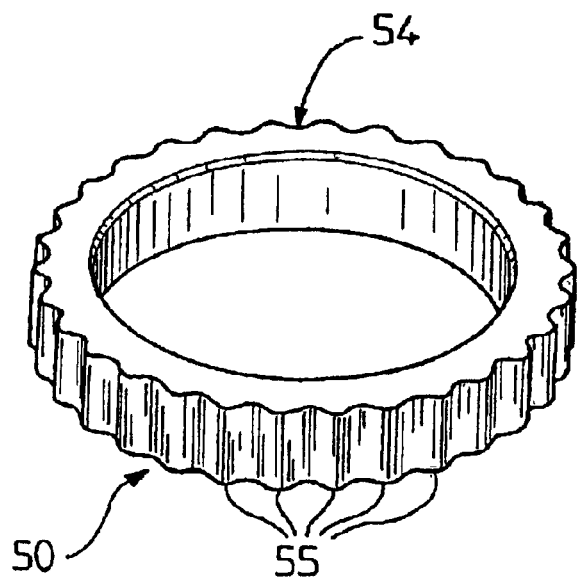
FIG. 10 is a perspective view of an outer ring of a reactor according to the invention.

As can be seen more particularly in FIG. 2, the outer ring 50 has a roughly rectangular cross section and in particular comprises an inner cylindrical face 52 facing towards the axis and an outer cylindrical face 54, also known as the outer annulus, on the opposite side. This outer annulus advantageously comprises reliefs of chosen shape (not visible in FIG. 2) such as, for example, knurling or corrugations 55 encouraging the attachment of the thermoplastic (FIG. 10). The outer ring 50 is made of a metal, advantageously steel. This ring 50 is also bounded by two opposite annular faces 56 and 58. As can be seen in FIG. 2, the thermoplastic of the body 32 covers, apart from the outer annulus 54, the two annular faces 56 and 58.

The body 32 of the reactor is formed as one piece by moulding of thermoplastic and comprises an axial thrust bearing 60, facing towards the impeller, and another axial thrust bearing 62 facing towards the turbine.

These two axial thrust bearings are surfaces which are generally annular and are intended to immobilise the reactor axially between the impeller and the turbine, a film of oil each time becoming trapped in order to provide lubrication and/or cooling. These two axial thrust bearings are moulded with the body of the reactor. The axial thrust bearing 62 on the same side as the turbine is radially offset from the axis X—X to allow direct mounting of the freewheel, that is to say of the other components of the freewheel apart from the outer ring 50, as will be seen later on.

The axial thrust bearing 60 on the same side as the impeller has radial ducts 64 (FIGS. 2 and 4) whose function is to lubricate and/or cool the axial thrust bearing 60 which is made of thermoplastic. The ducts 64 have, in fact, an arched shape (FIG. 4) so that they form a reserve of oil. Correspondingly, the axial thrust bearing 62 on the same side as the turbine is equipped with radial ducts 66 (FIG. 3) which have the same lubricating and/or cooling function as the axial thrust bearing 62. Here, again, these ducts extend in a generally radial direction and have an arched shape to supply a reserve of oil.

The body 32 comprises a guide bearing 66 (FIG. 2) which is also moulded-in and possibly machined so that it is a close, but friction-free, fit around the reactor shaft 36 (FIG. 1). This bearing is provided with axial ducts 68, running parallel to the axis X—X, and corresponding angularly with the radial ducts 64 of the axial thrust bearing 60 on the same side as the impeller.

Moulded with the body 32 are retaining clips 70 (FIG. 2), for example three of these, arranged 120° apart.

These clips 70 are formed by bosses and project radially towards the axis to form retaining nibs. These clips 70 have the function of coming into abutment against flexible elements 72 of an outer cage 74 of the freewheel, which is accommodated in the outer ring 50. The freewheel further comprises (FIG. 2) an inner cage 76 arranged around the shaft 36. Inserted between the cages 74 and 76 are a certain number of cams 78 and a spring leaf 80. Thus, the body 32 is first of all overmoulded around the outer ring 50, which then accommodates the other components of the freewheel, allowing a posteriori mounting.

Figure 3:
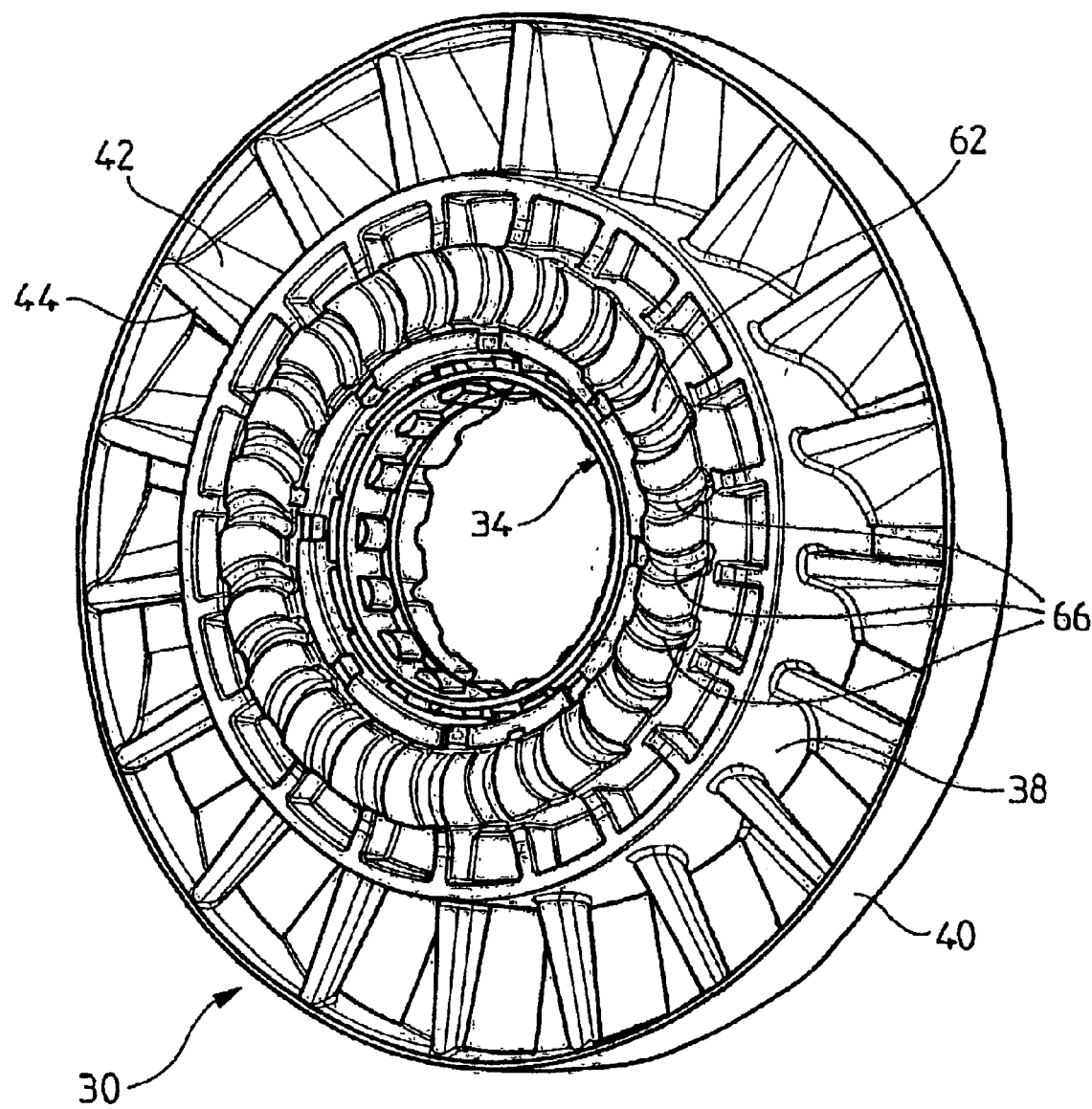
FIG. 3 is a perspective view of the reactor equipped with its freewheel, from its face facing towards the turbine.
Figure 5:
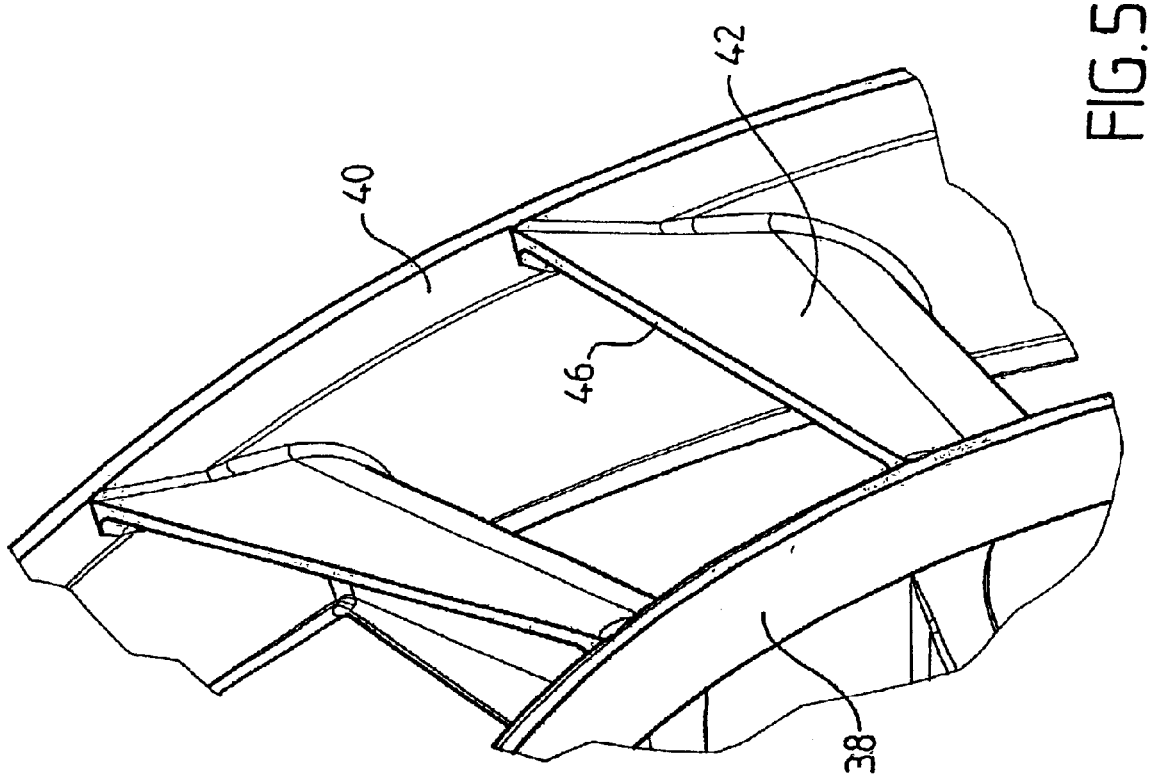
FIG. 5 depicts the detail V of FIG. 4, on an enlarged scale.
Figure 4:
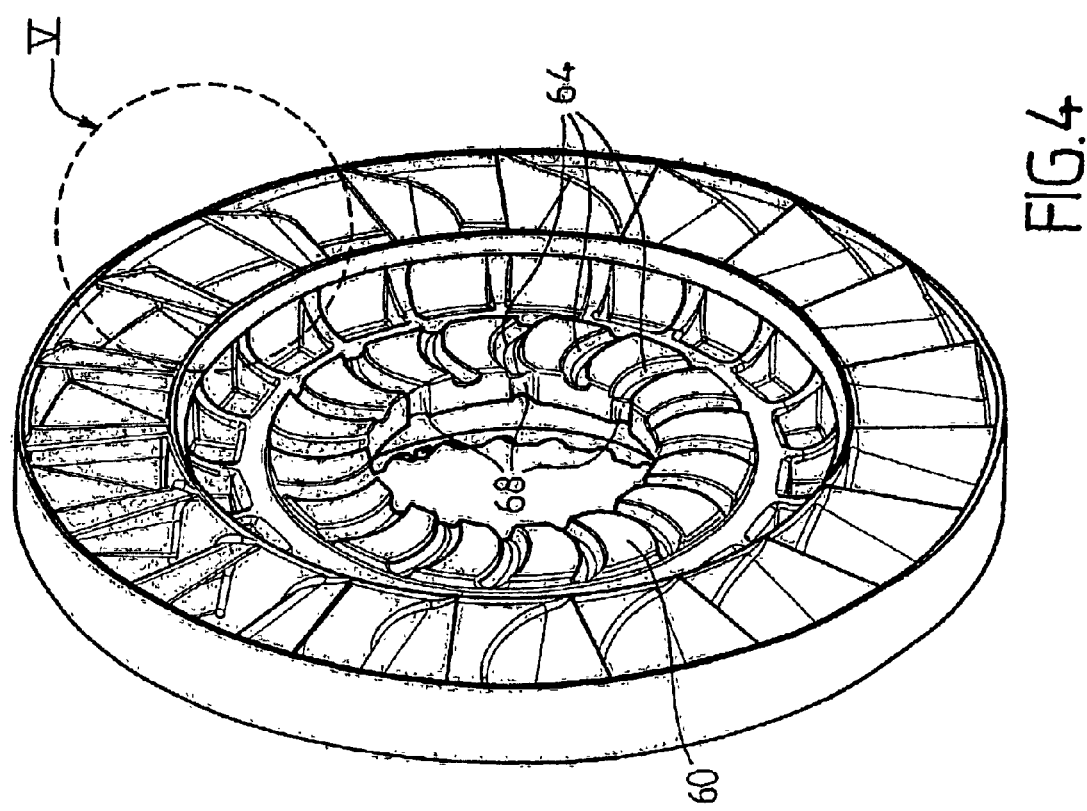
FIG. 4 is a perspective view of the reactor without its freewheel from its face facing towards the impeller.
Figure 7:
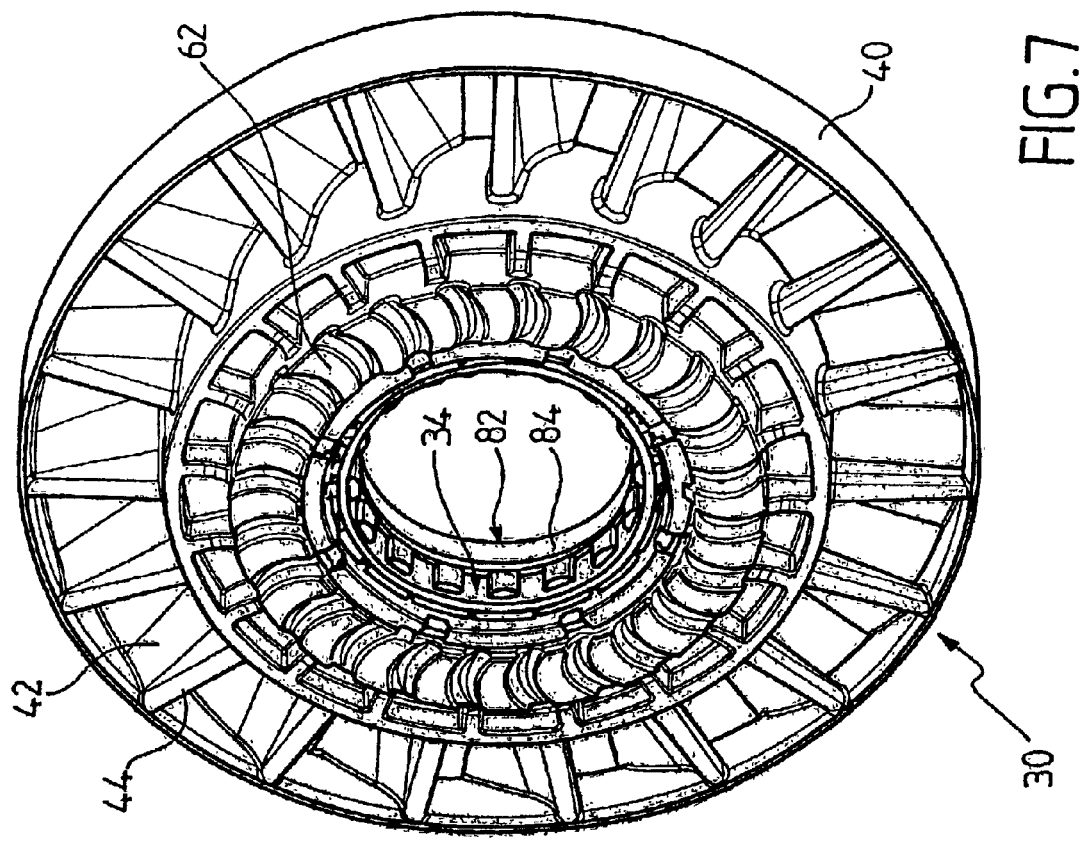
FIG. 7 is a perspective view of the reactor in FIG. 6, from its face facing towards the turbine.
Figure 6:
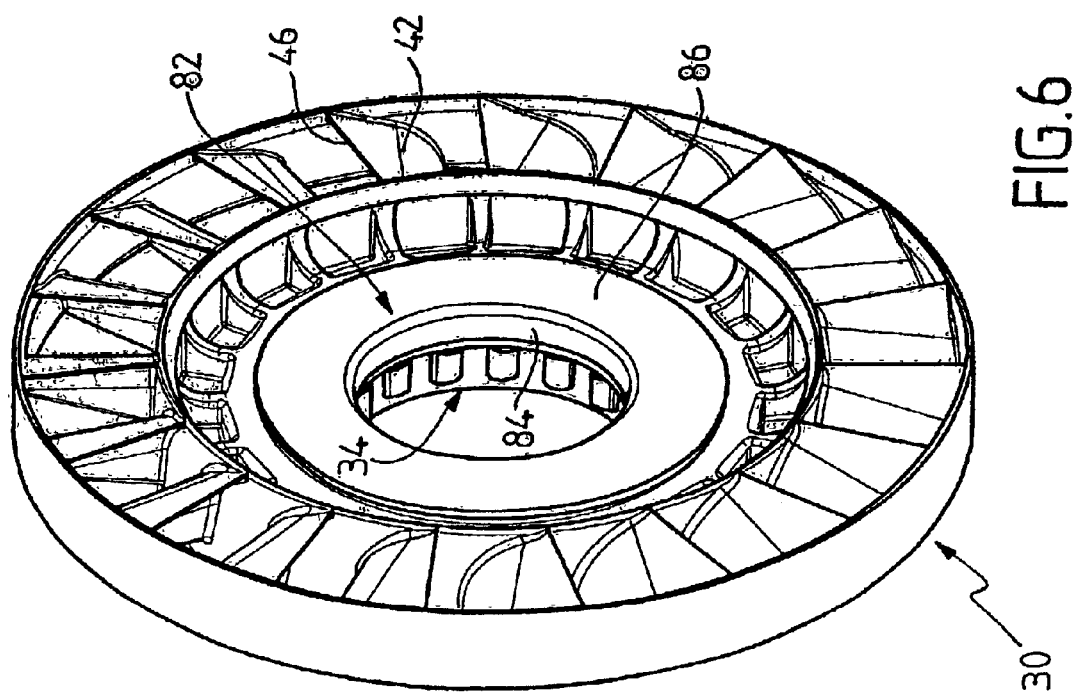
FIG. 6 is a perspective view, from its face facing towards the impeller, of a reactor equipped with its freewheel and equipped with a flanged ring in an alternative form of the invention.

The reactor 30 depicted in FIGS. 6 to 8 is similar to that of FIGS. 3 to 5 except that it is equipped with an additional thrust bearing 82 made up of a cylindrical bush 84 extended by a flange 86. This thrust bearing is mounted on the reactor 30 and is inserted between the reactor shaft 36 and the impeller hub 16, the flange 86 facing towards the impeller, as can be seen more particularly in FIG. 6. The thrust bearing 82 is advantageously made of a self-lubricating material, for example one based on bronze, molybdenum disulphide ($MOS_2$) and polytetrafluoroethylene (PTFE) powders, which may or may not be combined. It makes it possible to solve any problems there might be with the mechanical strength of the bearing and/or the thrust bearing of the impeller made of thermoplastic.

In the alternative embodiment in FIGS. 6 to 8, the flanged thrust bearing 82 replaces the axial thrust bearing 60 (on the same side as the impeller) and the guide bearing 66 of the previous embodiment (FIG. 4). As a result, the flange 86 is pressed against a plain annular face 88 of the reactor 30, as can be seen in FIG. 8. By contrast, the axial thrust bearing 62 (on the same side as the turbine), as visible in FIG. 7, is similar to that of the previous embodiment (FIG. 3).

Figure 9:
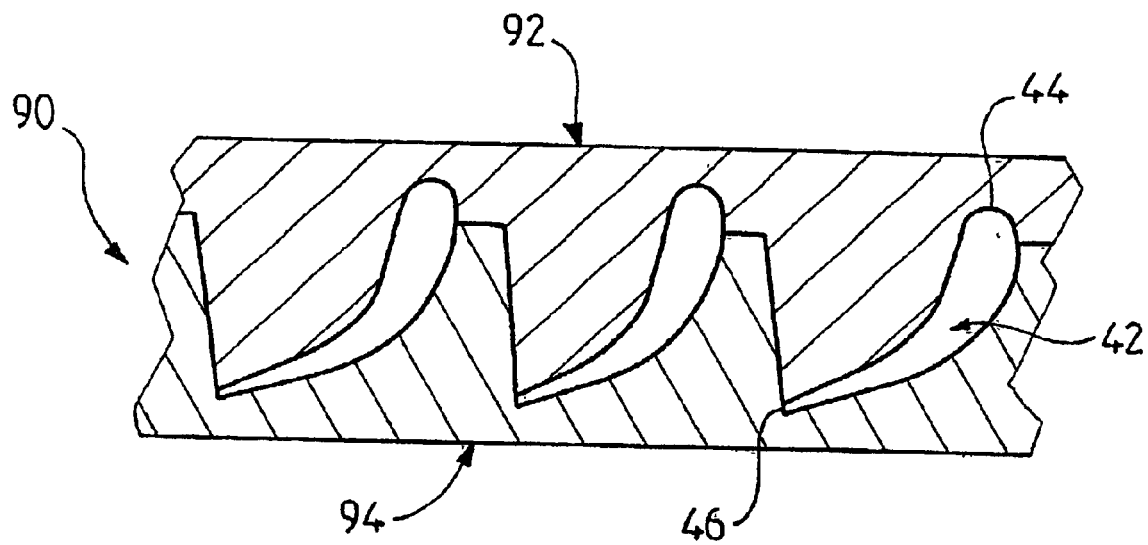
FIG. 9 is a part view in cross section of a mould that can be used for manufacturing a reactor according to the invention.

The reactor 30 of the invention can thus easily be manufactured using a mould 90 made of two parts 92 and 94, which can be brought closer together or moved further apart in the axial direction as depicted schematically in FIG. 9. For that, the outer ring is placed in the mould, then the mould is closed to allow the thermoplastic to be injected. This thermoplastic overmoulds the outer ring. After cooling, the two parts of the mould are separated, by being moved apart in the axial direction, allowing the reactor to be recovered, the body of which reactor is intimately connected, by overmoulding, to the outer ring. All that is then required is for the remainder of the freewheel to be mounted. If necessary, the bearing 66 may be machined to give it a precise diameter.

According to an important feature of the invention, during moulding the trailing edges 46 of the vanes of the reactor 42 are truncated, as can be seen in FIG. 4 and in the detail of FIG. 5. This truncation of the trailing edges, which is also visible in the section view of FIG. 9, constitutes a characteristic of the mould, there being one plane of closure between the vanes rather than more than one as in the prior art (see for example FR 2 767 889).

This design (one plane of closure of the mould) allows the vanes to be brought closer together and therefore the number of vanes to be increased and thereby the efficiency of the reactor to be improved by better guidance of the fluid. Furthermore, as this trailing edge is thicker, it does not have a very slender terminal part that is liable to break.

Figure 11:
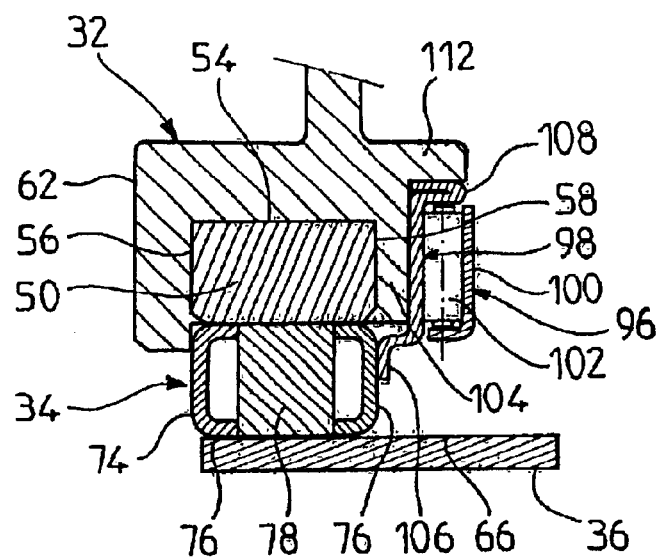
FIG. 11 is a partial section view of a reactor comprising a needle thrust bearing on the same side as the impeller.

In the embodiment of FIG. 11, the axial thrust bearing 62 on the same side as the turbine 24 is moulded with the body 32 as in the previous embodiment. By contrast, the axial thrust bearing on the same side as the impeller 12 is an attached thrust bearing, namely a needle thrust bearing 96. This thrust bearing 96 comprises an inner cheek 98 anchored mechanically into the plastic of the body 32 and an outer cheek 100 pressed against the impeller, and needles 102 arranged between the cheeks 98 and 100. The inner cheek 98 bears against an annular part 104 of the body 32, which annular part bears against the annular face 58 of the outer ring 50.

The inner cheek 98 has an inner annulus 106 which forms a shoulder and which bears against the inner cage 76 of the freewheel 34. The right-hand centring cheek 76 and the left-hand centring cheek 74 of the freewheel extend as far as the reactor shaft 36 and allow the reactor to be positioned on the reactor shaft.

Figure 12:
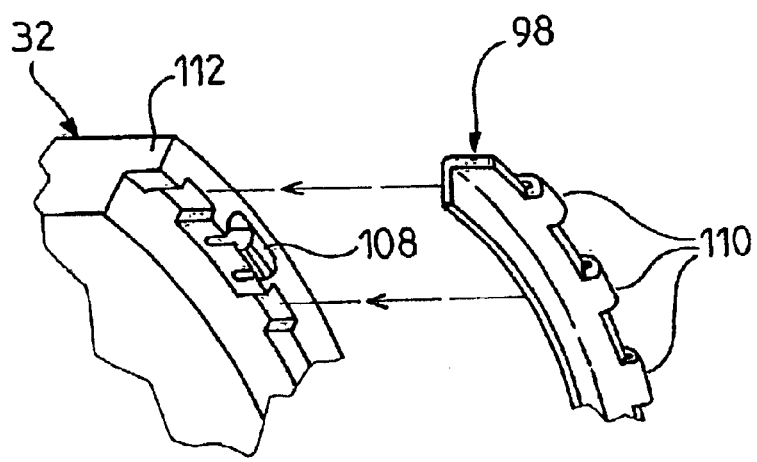
FIG. 12 is a partial view in perspective illustrating means of anchoring of the needle thrust bearing and of the body of the reactor.

The inner cheek 98 is mechanically attached to the body 32 by collaboration of shape between hooks or clips 108 of the body 32 and catching parts 110 of the inner cheek 98 (FIG. 12). The hooks or clips 108 are moulded with the body 32 and run in the radial direction from a shoulder 112 of the body 32 (FIGS. 11 and 12). The catching parts 110 of the inner cheek are formed by radial pads, spaced apart and bent outwards to delimit anchoring regions for the hooks or clips 108 (FIG. 12). Thus, the cheek 98 can be engaged in the body 32 in the direction of the arrows in FIG. 12 (axial direction) to be centred and prevented from rotating with respect to the body 32.

The embodiment in FIG. 3 is similar to that in FIG. 11 in that the reactor also comprises an axial thrust bearing 62 which is moulded-in and a needle thrust bearing 96 which is attached. However, the inner cheek 98 here bears directly against the outer ring 50, namely against an annular part 114 of the outer ring 50 which extends as far as the reactor shaft 36. The annular part 114 is made as one piece with the ring, the latter thus having an L-shaped cross section. The reactor is centred around the shaft 36 by the annular part 114. The inner cheek 98 is mechanically attached to the body 32 in the same way as in the case of FIG. 11.

Figure 13:
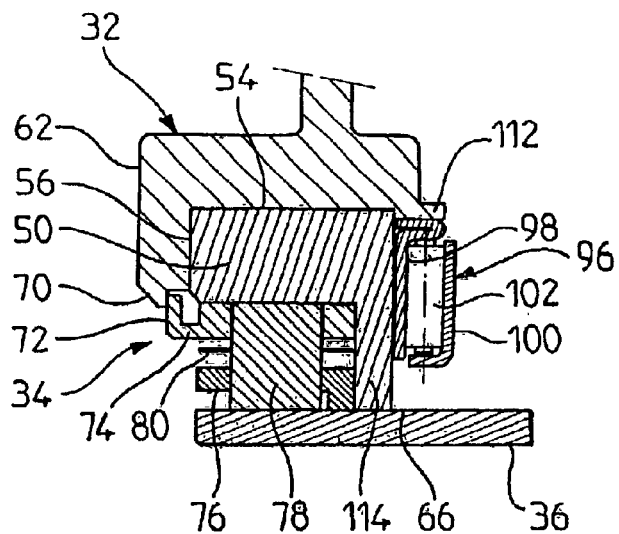
FIG. 13 is a view similar to FIG. 11 illustrating a reactor with needle thrust bearing according to another embodiment.
Figure 14:
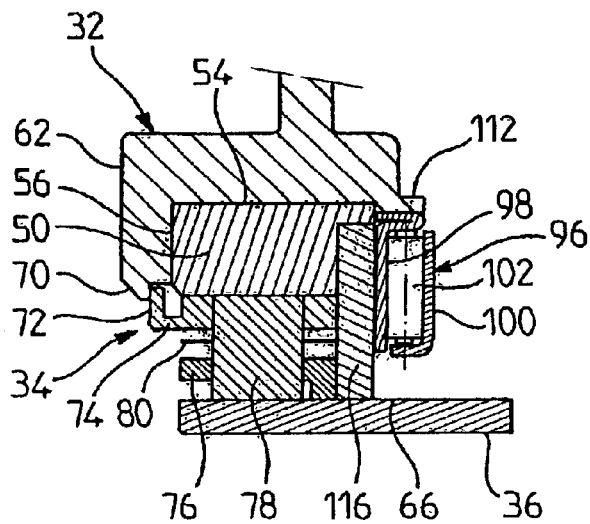
FIG. 14 is a view similar to FIG. 13 for an alternative embodiment.

The reactor in FIG. 14 is very similar to that of FIG. 13 in that the ring 50 comprises an annular part 116 which has the same function as the annular part 114 in FIG. 13. However, the annular part 116 is produced separately from the ring instead of being as one with it. In practice, it is a washer that can be made, for example, by fine cutting-out.

The invention has a preferred application in torque converters for motor vehicles.

What is claimed is:

1. Reactor for a torque converter, comprising a moulded body (32) able to be mounted around a reactor shaft (36) via a freewheel (34), being arranged coaxially between an impeller (12) and a turbine (24) along one and the same axis, characterized in that the body (32) of the reactor (30)is made of thermoplastic and is overmoulded around an outer ring (50) that the freewheel (34) comprises so that the thermoplastic covers an outer annulus (54) of the outer ring (50) and at least one annular face (56) of the outer ring (50) on the same side as the turbine (24), and wherein the body (32) comprises a guide bearing (66) which is also moulded in and is in a close but friction free fit around the reactor shaft (36).

2. Reactor according to claim 1, in which the body (32) comprises vanes (42) each having a leading edge (44) facing towards the turbine (24) and a trailing edge (46) facing towards the impeller (12), characterized in that the trailing edge (46) is truncated at the time of moulding.

3. Reactor according to claim 1, characterized in that the body (32) comprises an axial thrust bearing (60; 96) on the same side as the impeller (12) and an axial thrust bearing (62) on the same side as the turbine (24), at least one of these axial thrust bearings being molded with the body (32).

4. Reactor according to claim 3, characterized in that the axial thrust bearing (60) on the same side as the impeller (12) and the axial thrust bearing (62) on the same side as the turbine (24) are moulded with the body (32), and in that the axial thrust bearing (62) on the same side as the turbine is radially offset from the axis (X—X) to allow direct mounting of the freewheel.

5. Reactor according to claim 3, characterized in that the axial thrust bearing (60) on the same side as the impeller (12) and the axial thrust bearing (62) on the same side as the turbine (24) each comprise radial lubricating and/or cooling ducts (64; 66) running in a generally radial direction.

6. Reactor according to claim 5, characterized in that the body (32) comprises a bearing (66) for rotational guidance about the reactor shaft (36), this bearing being equipped with axial lubricating and/or cooling ducts (68) running in a generally axial direction and corresponding angularly with the radial lubricating and/or cooling ducts (64) of the axial thrust bearing (60) on the same side as the impeller.

7. Reactor according to claim 3, characterized in that the axial thrust bearing (60) on the same side as the impeller (12) is a needle thrust bearing (96), while the axial thrust bearing (62) on the same side as the turbine (24) is moulded within the body (32).

8. Reactor according to claim 7, characterized in that the needle thrust bearing (96) comprises an inner cheek (98) mechanically anchored in the plastic of the body (32) by anchoring means (108, 110) and an outer cheek (100) pressed against the impeller (12).

9. Reactor according to claim 8, characterized in that the inner cheek (98) bears against an annular part (104) of the body (32), which annular part (104) bears against the outer ring (50).

10. Reactor according to claim 8, characterized in that the inner cheek (98) bears against an annular part (114; 116) of the outer ring (50) which extends as far as the reactor shaft (36).

11. Reactor according to claim 1, characterized in that the body (32) is equipped with a flanged thrust bearing (82), made up of a cylindrical bush (84) extended by a flange (86), forming a thrust bearing via its flange and a bearing via its bush (84), this flanged thrust bearing (82) advantageously being made of a self-lubricating material so as to allow sliding on the impeller hub (16) and the reactor shaft (36).

12. Reactor according to claim 1, characterized in that the body (32) comprises retaining clips (70) formed by moulded-in bosses projecting radially towards the axis (X—X) to come into abutment against flexible elements (72) of an outer cage (74) of the freewheel, which is accommodated in the outer ring (50).

13. Reactor according to claim 1, characterized in that the outer ring (50) is metallic, and has reliefs (55) of knurling or corrugations shape, produced on the outer annulus (54) of the outer ring (50) and over which the plastic of the body (32) is moulded, and wherein the reliefs (55) are intended to provide an anchoring of the plastic of the body (32).

14. Torque converter comprising a reactor (30) arranged coaxially between an impeller (12) and a turbine (24), characterized in that the reactor (30) is as defined in claim 1.

* * * * *